Feb. 15, 1927.
H. O. SCRANTON
SHEARS FOR RICE STRAW
Filed Jan. 25, 1926
1,617,461
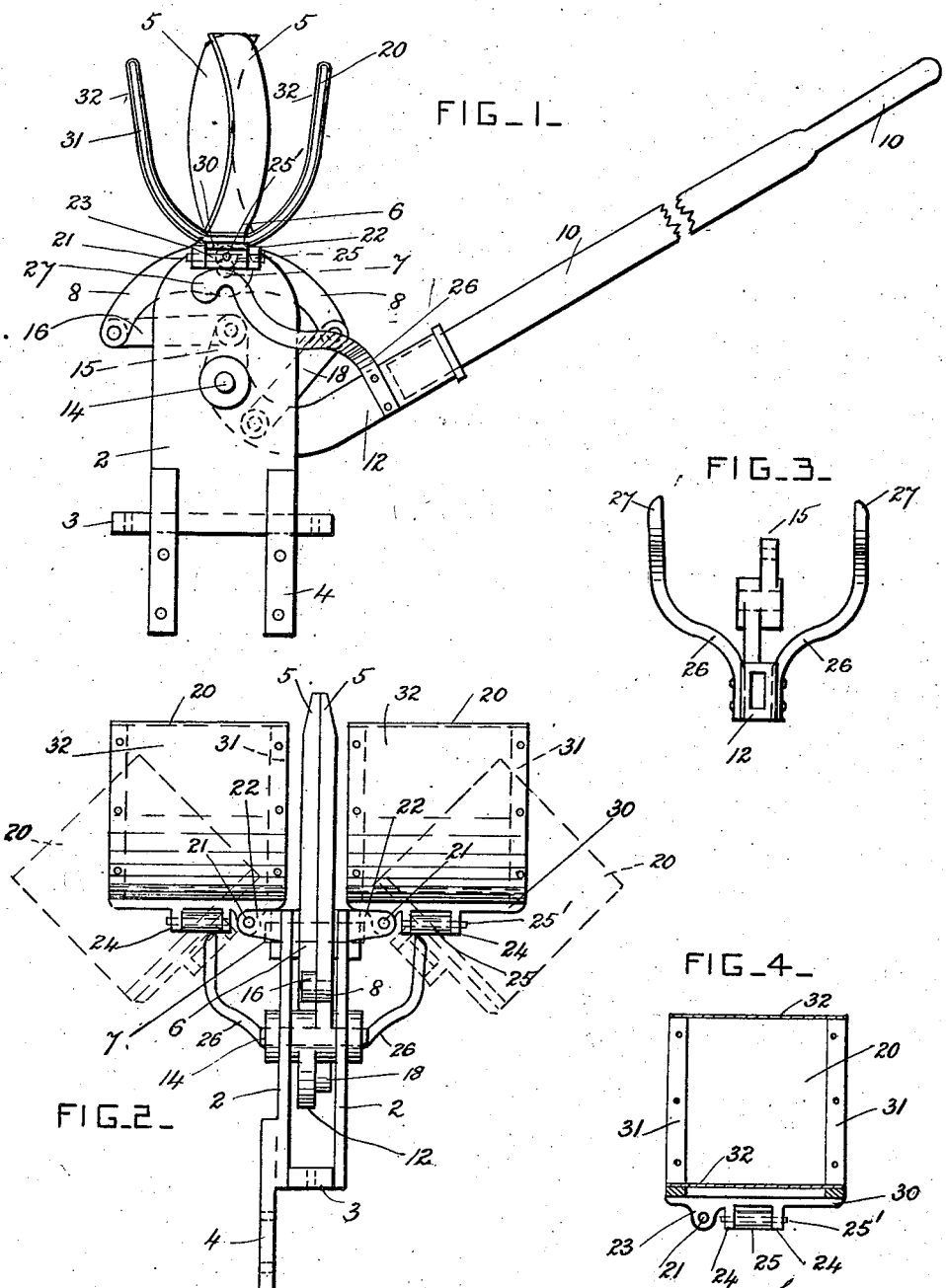

Patented Feb. 15, 1927.

1,617,461

UNITED STATES PATENT OFFICE.

HENRY O. SCRANTON, OF JEANERETTE, LOUISIANA.

SHEARS FOR RICE STRAW.

Application filed January 25, 1926. Serial No. 83,657.

This invention relates to shears especially adapted for cutting bundles of rice straw, as shown in the Patent No. 1,359,752, issued to me on November 23, 1920; and it consists in providing the shears with automatic tilting supports, as hereinafter fully described and claimed, so that the ends of the bundle of straw are held up to enable the shears to operate to good advantage, and the severed parts of the bundle are subsequently discharged while the shear blades are being moved apart.

In the drawings, Figure 1 is a side view of a shears provided with supports according to this invention, and showing the supports raised. Fig. 2 is a front view of the same. Fig. 3 is a plan view of the lever and arms for raising the supports. Fig. 4 is a front view of one support partially in section.

A frame is provided having side plates 2 provided at their bases with lugs 3 and 4 for securing it to any stationary support. The shear blades 5 are curved, and have crossed shanks 6 pivoted to the frame between its side plates by a pin 7. The shanks 6 have laterally projecting arms 8 which are substantially horizontal when the blades are open. The blades are operated by a handle 10 engaging with a lever 12 which is pivoted between the plates 2 on a pin 14 under the pin 7. A short arm 15 projects upwardly from the lever 12 above its pivot. A link 16 is pivoted between one of the arms 8 and the short arm 15. A similar link 18 is pivoted between the other arm 8 and the lever 12 to one side of its pivot. All of these parts are substantially the same as shown and described in the said patent.

In order to support the end portions of the bundles of straw while being cut by the blades, trough-shaped supports or chutes 20 are pivoted by lugs 23 and pins 21 to lugs 22 which project from the side plates 2 adjacent to the pivot pin 7. When the shear blades are open, and in a position to receive the bundle of straw, these supports are tilted to the inclined positions indicated by dotted lines in Fig. 2. Each support has lugs 24 on its bottom, and an antifriction roller 25 is journaled by a pin 25' between these lugs, and arranged with its axis crosswise of the axis of the pin 7 on which the blades are pivoted.

Curved arms 26 are provided, and are secured at one end to the lever 12, one at each side thereof. These arms have curved free end portions 27 which engage with the rollers 25. The parts 27 are curved so that they permit the supports to assume their tilted positions by gravity when the lever is moved so as to open the blades. When the lever is moved so as to close the blades, and sever the bundle of straw, the arms 26 bear on the rollers 25 and raise the supports to a horizontal position as shown by full lines in Fig. 2. The ends of the bundle are raised while the blades are cutting through it, and the bundle is supported in a substantially compact form and horizontal position when the cutting operation is completed.

When the blades are opened, by moving the lever in the reverse direction, the supports are tilted downwardly and automatically by gravity, and they form chutes for the discharge of the severed end portions of the bundle.

Each support has a base piece 30 from which the lugs 23 and 24 project. U-shaped frames 31 have their lower parts secured to the end portions of the base piece 30, and project upwardly of it parallel to each other. A sheet 32 of thin sheet metal is bent over the inside and outside of the frames 31 and is riveted to them. The channel-shaped supports formed in this manner are very strong and light, and are not easily bent or broken. When a shears is provided with tilting supports in this way the bundles of straw can be cut to better advantage, and the cut portions slide down the supports or chutes in substantially compact form and without being scattered. If a shears were provided with horizontal stationary supports for the straw, each half of the cut bundle would have to be removed by hand from the supports.

What I claim is:

1. The combination, with a supporting frame, shear blades pivoted to the frame, and a lever for operating the shear blades; of automatic tilting supports for the article to be cut pivoted to the said frame and arranged one at each side thereof, said supports being raised during the cutting and closing movement of the blades and tilted to form inclined discharge chutes for the article during the opening movement of the blades.

2. A shears provided with automatic tilting supports as set forth in claim 1, the said supports being U-shaped in cross-section and arranged with their sides projecting upwardly to correspond with the position of the blades when separated to receive the article.

3. A shears provided with automatic tilting supports as set forth in claim 1, the said supports being provided with anti-friction rollers on their lower parts, and the said lever being provided with arms for engaging the said rollers.

4. A shears provided with automatic tilting supports as set forth in claim 1, each support comprising a base piece which is pivoted to the frame, U-shaped frames secured to the end portions of the base piece, and a plate secured over the said frames and forming a channel-shaped chute for the end portion of the object when cut.

5. The combination, with a supporting frame, a shearing device pivoted to the frame, and a lever for operating the shearing device; of an automatic tilting support for the article to be cut pivoted to the said frame, said tilting support being raised by the lever during the shearing movement of said device and tilted to form an inclined discharge chute during its reverse movement.

In testimony whereof I have affixed my signature.

HENRY O. SCRANTON.